US012699485B2

(12) United States Patent
Kang et al.

(10) Patent No.: US 12,699,485 B2
(45) Date of Patent: Aug. 4, 2026

(54) TOUCH DISPLAY DEVICE AND METHOD OF CONTROLLING SAME

(71) Applicant: LG Display Co., Ltd., Seoul (KR)

(72) Inventors: Seong Kyu Kang, Paju-si (KR); Seong Ho Lim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/924,694

(22) Filed: Oct. 23, 2024

(65) Prior Publication Data

US 2025/0216986 A1 Jul. 3, 2025

(30) Foreign Application Priority Data

Dec. 29, 2023 (KR) ........................ 10-2023-0197909

(51) Int. Cl.
*G06F 3/041* (2006.01)
*G06F 3/044* (2006.01)

(52) U.S. Cl.
CPC ........ *G06F 3/04186* (2019.05); *G06F 3/0412* (2013.01); *G06F 3/04164* (2019.05); *G06F 3/0446* (2019.05)

(58) Field of Classification Search
CPC .............. G06F 3/04186; G06F 3/0446; G06F 3/04164; G06F 3/0412
See application file for complete search history.

(56) References Cited

U.S. PATENT DOCUMENTS 11,487,396 B2 * 11/2022 Shim ...................... H10K 59/40
2020/0210025 A1 * 7/2020 Kim ...................... G06F 3/0443

FOREIGN PATENT DOCUMENTS

KR    10-2013-0078462 A    7/2013
KR    10-2020-0083195 A    7/2020

* cited by examiner

*Primary Examiner* — Peter D McLoone
(74) *Attorney, Agent, or Firm* — Birch, Stewart, Kolasch & Birch, LLP

(57) ABSTRACT

A touch display device includes a touch panel having a plurality of touch electrodes and a plurality of signal lines. The touch electrodes are divided into two or more blocks, and touch electrodes belonging to different blocks is connected to one signal line. The touch display device can further include a touch sensing circuit configured to generate raw data based on voltages of the touch electrodes input through the signal lines and determine real touch data from the raw data. The touch sensing circuit predicts an area where the real touch data is able to be generated from raw data of one frame and determines the real touch data by reflecting ghost data generated in areas other than the area where the real touch data is able to be generated in estimated touch data included in the area where the real touch data is able to be generated.

14 Claims, 15 Drawing Sheets

1 Frame Raw data

1 Frame Raw data

<Raw data distribution of real touch>

| | | | | | | |
|---|---|---|---|---|---|---|
| 0 | 3 | 0 | 30 | 0 | 6 | 0 |
| -1 | 0 | -1 | -1 | -1 | 0 | -1 |
| 0 | 1 | 0 | 10 | 0 | 2 | 0 |
| -1 | 2 | -1 | 11 | -1 | 3 | -1 |
| -1 | -1 | 8 | 0 | 13 | -1 | -1 |
| 0 | 2 | 8 | 17 | 13 | 3 | 0 |
| -1 | 4 | 18 | 35 | 29 | 7 | -1 |
| -1 | 4 | 32 | 31 | 56 | 6 | 0 |
| 0 | 2 | 4 | 11 | 9 | 2 | -1 |
| 0 | -1 | 0 | 0 | 0 | -1 | 0 |
| 0 | -1 | 14 | 0 | 26 | -1 | -1 |
| 0 | -1 | 14 | -1 | 26 | 0 | 0 |
| 2 | 7 | 17 | 13 | 3 | -1 | -1 |
| 3 | 21 | 39 | 46 | 16 | 3 | -1 |
| 4 | 14 | 35 | 26 | 15 | 0 | -1 |
| 1 | 4 | 11 | 8 | 2 | -1 | 0 |
| -1 | 4 | -1 | 35 | -1 | 7 | -1 |
| 0 | 0 | -1 | 0 | -1 | 0 | -1 |
| 0 | 2 | 8 | 16 | 13 | 4 | -1 |
| 0 | 8 | 18 | 65 | 29 | 14 | 0 |
| 0 | 3 | 14 | 30 | 26 | 6 | 0 |
| 4 | 2 | 35 | 11 | 15 | 3 | -1 |
| 0 | 4 | -1 | 35 | -1 | 7 | -1 |
| 0 | -1 | 0 | 0 | 0 | -1 | 0 |
| -1 | 7 | -1 | 13 | -1 | -1 | -1 |
| -1 | 4 | 18 | 8 | 29 | -1 | -1 |
| 0 | 2 | 0 | 16 | 0 | 4 | 0 |
| 2 | 0 | 17 | -1 | 3 | 0 | -1 |
| 1 | -1 | 11 | 0 | 2 | -1 | 0 |
| 0 | 4 | 8 | 31 | 13 | 6 | -1 |
| -1 | -1 | -1 | 0 | -1 | -1 | -1 |
| -1 | 21 | 8 | 46 | 13 | 3 | -1 |
| -1 | 4 | 32 | 35 | 56 | 7 | 0 |
| 0 | 8 | 14 | 65 | 26 | 14 | -1 |
| 3 | 1 | 39 | 10 | 16 | 2 | -1 |
| -1 | 2 | -1 | 17 | -1 | 3 | -1 |
| 0 | 2 | 18 | 11 | 29 | 2 | 0 |
| 0 | -1 | 0 | -1 | 0 | 0 | 0 |
| 0 | 14 | 8 | 26 | 13 | 0 | 0 |
| 0 | 0 | 4 | 0 | 9 | 0 | -1 |
| -1 | 3 | 8 | 30 | 13 | 6 | -1 |
| 3 | -1 | 39 | 0 | 16 | -1 | -1 |
| 0 | 2 | 0 | 16 | 0 | 4 | 0 |
| 0 | 4 | 14 | 31 | 26 | 6 | 0 |
| 0 | 4 | 0 | 35 | 0 | 7 | 0 |
| 0 | 2 | 0 | 17 | 0 | 3 | 0 |
| 0 | 14 | 8 | 26 | 13 | 0 | 0 |
| -1 | 2 | 32 | 11 | 56 | 3 | 0 |
| -1 | 7 | -1 | 13 | -1 | -1 | -1 |
| 0 | 0 | 8 | -1 | 13 | 0 | 0 |
| 4 | -1 | 35 | 0 | 15 | -1 | -1 |
| -1 | 8 | -1 | 65 | -1 | 14 | -1 |
| 2 | 2 | 17 | 11 | 3 | 2 | -1 |
| -1 | 0 | -1 | 0 | -1 | 0 | -1 |
| 0 | 4 | 14 | 35 | 26 | 7 | -1 |
| 0 | 4 | 18 | 8 | 29 | -1 | 0 |
| 0 | -1 | 4 | 0 | 9 | -1 | -1 |
| 0 | 21 | -1 | 46 | -1 | 3 | -1 |
| -1 | 1 | 18 | 10 | 29 | 2 | -1 |
| 1 | -1 | 11 | -1 | 2 | 0 | 0 |

3 Finger Drawing
@Gaussian Filter

3 Finger Drawing
@Pattern backtracking data restoration

TOUCH DISPLAY DEVICE AND METHOD OF CONTROLLING SAME

CROSS-REFERENCE TO RELATED APPLICATIONS

This application claims priority to Korean Patent Application No. 10-2023-0197909, filed in the Republic of Korea on Dec. 29, 2023, the entire contents of which is hereby expressly incorporated by reference into the present application.

BACKGROUND OF THE INVENTION

Field of the Invention

The present disclosure relates to a touch display device and a method of controlling the same.

Discussion of the Related Art

A touch display device provides a touch-based input function that allows users to intuitively and conveniently input information or commands along with a display function of displaying videos or images.

To provide a touch-based input function, it is needed to determine whether the presence or absence of a user touch and accurately sense a touch position. Accordingly, a touch display device includes a plurality of touch electrodes to detect the presence or absence of a touch or calculate touch coordinates corresponding to the touch.

In a case where a separate touch panel is stacked on such a touch display device, the thickness of the display device increases and there can be limitations in manufacturing a thin display device. Further, light transmission efficiency can decrease as light passes through the stacked touch panel, and manufacturing costs can increase. To solve such a limitation, an advanced in-cell touch (AIT) type display device in which touch electrodes are embedded in a pixel area of a display panel has recently been proposed.

Meanwhile, as the size and resolution of such touch display devices increase, the number of touch electrodes also increases, and thus the number of signal lines and the number of touch channels for sensing multiple touch electrodes would also increase, increasing the complexity of manufacturing the panel. Further, it can take a long time to complete touch sensing by such display device because all electrodes need to be sequentially sensed.

SUMMARY OF THE INVENTION

Accordingly, the present disclosure is directed to a touch display device and a method of controlling the same that substantially obviate one or more problems due to limitations and disadvantages of the related art.

An object of the present disclosure is to provide a touch display device and a method of controlling the same which can ensure accuracy of touch recognition while reducing the number of signal lines and the number of touch channels.

Additional advantages, objects, and features of the present disclosure will be set forth in part in the description which follows and in part will become apparent to those having ordinary skill in the art upon examination of the following or can be learned from practice of the present disclosure. The objectives and other advantages of the present disclosure can be realized and attained by the structure particularly pointed out in the written description and claims hereof as well as the appended drawings.

To achieve these objects and other advantages and in accordance with the purpose of the present disclosure, as embodied and broadly described herein, a touch display device includes a touch panel including a plurality of touch electrodes and a plurality of signal lines, wherein the touch electrodes are divided into two or more blocks, and touch electrodes belonging to different blocks is connected to one signal line, and a touch sensing circuit configured to generate raw data based on voltages of the touch electrodes input through the signal lines and to determine real touch data from the raw data, wherein the touch sensing circuit predicts an area where the real touch data is able to be generated from raw data of one frame and determines the real touch data by reflecting ghost data generated in areas other than the area where the real touch data is able to be generated in estimated touch data included in the area where the real touch data is able to be generated.

According to one or more aspects of the present disclosure, the estimated touch data and the ghost data can share the signal lines.

According to one or more aspects of the present disclosure, if all raw data included in a preset area in the raw data of one frame is equal to or greater than a reference value, the touch sensing circuit can predict the preset area as the area where the real touch data is able to be generated.

According to one or more aspects of the present disclosure, the touch sensing circuit can determine the real touch data by adding the ghost data to the estimated touch data and then removing the ghost data.

According to one or more aspects of the present disclosure, when two or more pieces of estimated touch data sharing a signal line are generated in an area where two or more pieces of real touch data are able to be generated, the touch sensing circuit can divide the ghost data and add the divided ghost data to the respective pieces of estimated touch data.

According to one or more aspects of the present disclosure, the touch sensing circuit can set a weight depending on values of raw data adjacent to each piece of estimated touch data, divide the ghost data according to the weight, and add the ghost data to the estimated touch data.

According to one or more aspects of the present disclosure, when estimated touch data sharing the signal lines is generated in all blocks, the touch sensing circuit can maintain each piece of estimated touch data.

According to one or more aspects of the present disclosure, the touch sensing circuit can include a touch driving circuit configured to convert voltage signals of the touch electrodes input through the signal lines into digital signals to generate raw data for each of the plurality of blocks, and a touch controller configured to determine real touch data from the raw data and to determine information on a position where a real touch input has occurred on the touch panel.

According to one or more aspects of the present disclosure, the touch driving circuit can generate raw data for each of the plurality of touch electrodes connected to the one signal line.

According to one or more aspects of the present disclosure, each block of the touch panel can include two or more touch electrode rows, and two or more touch electrodes included in the same touch electrode column can be connected to one signal line.

In another aspect of the present disclosure, a method of controlling a touch display device including a touch panel including a plurality of touch electrodes and a plurality of signal lines, wherein the touch electrodes are divided into a plurality of blocks, and a plurality of touch electrodes belonging to different blocks is connected to one signal line includes generating raw data of one frame based on voltages of the touch electrodes input through the signal lines, predicting an area in which all raw data included in a preset area in the raw data of one frame is equal to or greater than a reference value as an area where real touch data is able to be generated, reflecting ghost data sharing a signal line with estimated touch data included in the area where the real touch data is able to be generated and generated in an area other than the area where the real touch data is able to be generated in the estimated touch data, and deleting the ghost data, and determining the real touch data based on the estimated touch data.

According to one or more aspects of the present disclosure, the reflecting the ghost data in the estimated touch data can include, when two or more pieces of estimated touch data are generated, dividing the ghost data and adding the divided ghost data to the respective pieces of estimated touch data.

According to one or more aspects of the present disclosure, the dividing and adding the ghost data can include setting a weight depending on values of raw data adjacent to each piece of estimated touch data, and dividing the ghost data according to the weight and adding the divided ghost data.

According to one or more aspects of the present disclosure, the method can further include, when estimated touch data is generated in all blocks, maintaining each piece of estimated touch data.

It is to be understood that both the foregoing general description and the following detailed description of the present disclosure are exemplary and explanatory and are intended to provide further explanation of the present disclosure as claimed.

BRIEF DESCRIPTION OF THE DRAWINGS

The accompanying drawings, which are included to provide a further understanding of the present disclosure and are incorporated in and constitute a part of this application, illustrate aspect(s) of the present disclosure and together with the description serve to explain the principle of the present disclosure. In the drawings:

FIG. 1 is a schematic system configuration diagram of a touch display device according to an aspect of the present disclosure;

FIGS. 12 to 14 are example diagrams for describing a method of processing touch data according to an aspect of the present disclosure.

DETAILED DESCRIPTION OF THE EMBODIMENTS

Figure 2:
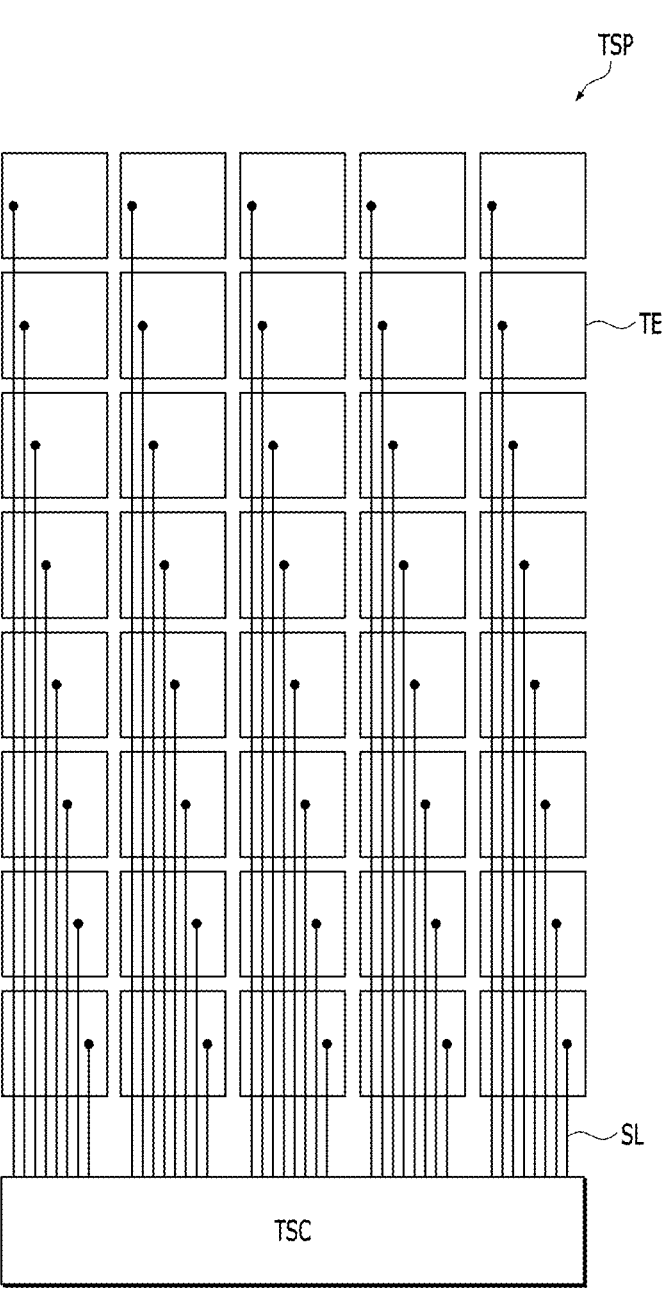
FIG. 2 is a diagram for describing a configuration of a touch sensing part according to a comparative example.

The advantages and features of the present disclosure and the way of attaining the same will become apparent with reference to aspects described below in detail in conjunction with the accompanying drawings. The present disclosure, however, is not limited to the aspects disclosed hereinafter and can be embodied in many different forms. Rather, these exemplary aspects are provided so that this disclosure will be through and complete and will fully convey the scope to those skilled in the art.

The shapes, sizes, ratios, angles, numbers, and the like, which are illustrated in the drawings in order to describe various aspects of the present disclosure, are merely given by way of example, and therefore, the present disclosure is not limited to the illustrations in the drawings. In the present disclosure, when the terms "comprise", "include", and the like are used, other elements can be added unless the term "only" is used. The singular forms are intended to include the plural forms as well, unless the context clearly indicates otherwise.

In interpretation of a component, the component is interpreted as including an error range unless otherwise explicitly described.

When describing positional relationships, for example, when the positional relationship between two parts is described using "on", "above", "below", "beside", or the like, one or more other parts can be located between the two parts unless the term "directly" or "closely" is used.

In the description of the various aspects of the present disclosure, although terms such as, for example, "first" and "second" can be used to describe various elements, these terms are merely used to distinguish the same or similar elements from each other and may not define order or sequence. Therefore, in the present disclosure, an element modified by "first" can be the same as an element modified by "second" within the technical scope of the present disclosure unless otherwise mentioned.

Like reference numerals refer to substantially like elements throughout the specification. Hereinafter, aspects of the present disclosure will be described in detail with reference to the attached drawings. In the following description, when it is determined that detailed description of a known function or configuration related to the present disclosure can unnecessarily obscure the subject matter of the present disclosure, the detailed description will be omitted.

Further, the term "can" fully encompasses all the meanings and coverages of the term "may." In addition, all the components of each display device or apparatus according to all embodiments of the present disclosure are operatively coupled and configured.

Figure 1:
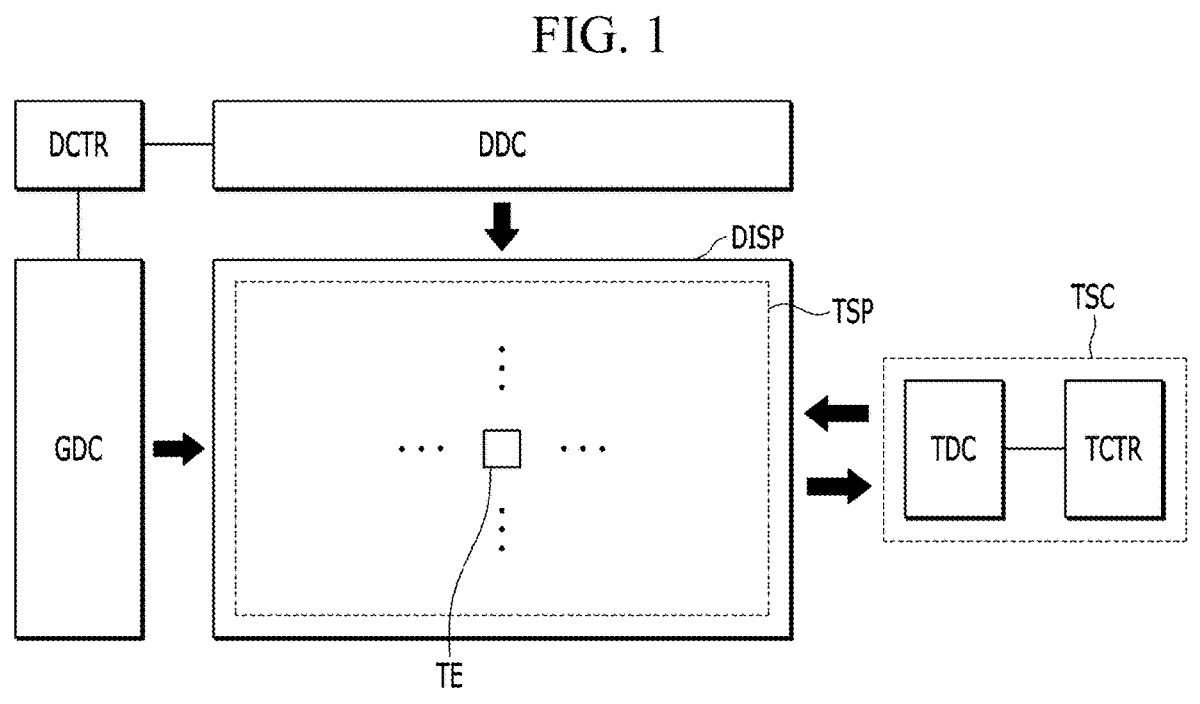

FIG. 1 is a schematic system configuration diagram of a touch display device according to aspects of the present disclosure.

Referring to FIG. 1, the touch display device according to aspects of the present disclosure can include a display part for providing an image display function and a touch sensing part for touch sensing.

The display part can include a display panel DISP in which multiple data lines and multiple gate lines are arranged and multiple subpixels are arranged, a data driving circuit DDC that drives the data lines, a gate driving circuit GDC that drives the gate lines, and a display controller DCTR that controls the operations of the data driving circuit DDC and the gate driving circuit GDC.

The gate driving circuit GDC sequentially supplies gate signals at an on or off voltage to the plurality of gate lines under the control of the display controller DCTR.

When a specific gate line GL is open by the gate driving circuit GDC, the data driving circuit DDC converts an image data signal received from the display controller DCTR into an analog image signal and supplies a data signal Vdata corresponding to the analog image signal through the multiple data lines.

The display controller DCTR can display an image by controlling the data driving circuit DDC and the gate driving circuit GDC to cause subpixels of the display panel DISP to emit light. The display controller DCTR can start scanning according to a timing set in each frame, convert external input video data into a data signal format used by the data driving circuit DDC, output the converted video data, and control data driving at an appropriate time according to scanning.

The display controller DCTR can be a timing controller or a control device that additionally performs other control functions including a timing controller.

The touch sensing part can include a touch panel TSP including a plurality of touch electrodes TE, and a touch sensing circuit TSC that supplies a touch driving signal to the touch panel TSP, detects a touch sensing signal from the touch panel TSP, and senses presence or absence of user touch or touch coordinates on the touch panel TSP on the basis of the detected touch sensing signal.

The touch panel TSP can detect touching or approaching of a finger or a pen. The touch panel TSP can be an external type provided outside the display panel DISP or can be an internal type provided inside the display panel DISP. If the touch panel TSP is an external type, the touch panel TSP and the display panel DISP can be manufactured separately and then combined using an adhesive or the like. The external type touch panel TSP is also called an add-on type touch panel. If the touch panel TSP is an internal type, the touch panel TSP can be manufactured in a process of manufacturing the display panel DISP. For example, touch sensors constituting the touch panel TSP can be disposed inside the display panel DISP. The internal type touch panel TSP can be of an in-cell type, an on-cell type, or a hybrid type. In the following description, it is assumed that the touch panel TSP is an internal type touch panel disposed inside the display panel DISP.

The touch sensing circuit TSC can detect presence or absence of a touch input to the touch panel TSP and a touch position. For example, the touch sensing circuit TSC can include a touch driving circuit TDC and a touch controller TCTR.

The touch driving circuit TDC can supply a touch driving signal to the touch panel TSP and receive a touch sensing signal generated from the touch panel TSP. The touch sensing signal can be received as a change in a voltage waveform. The touch driving circuit TDC can generate raw data for touch sensing processing by converting changes in voltage waveforms received from the touch electrodes TE into digital data. Accordingly, the touch driving circuit TDC can include an amplifier that amplifies received voltages of the touch electrodes TE, an integrator that accumulates the voltages from the amplifier, and an analog-to-digital converter (ADC) that converts the voltage from the integrator into digital data. The touch driving circuit TDC can supply the raw data to the touch controller TCTR.

The touch controller TCTR can process raw data of one frame containing voltage values of all the touch electrodes included in the touch panel TSP and determine information on a position where the real touch input is applied on the touch panel TSP.

The touch sensing circuit TSC can include one or more touch driving circuits TDC, and each touch driving circuit TDC can be implemented as one integrated circuit (IC), or two or more touch driving circuits TDC can be implemented as one IC. Meanwhile, the touch driving circuit TDC included in the touch circuit 300 can be integrated into an integrated circuit SRIC together with a source driver integrated circuit SDIC that implements the data driving circuit 120.

The touch sensing circuit TSC can sense a touch on the basis of self-capacitances of touch electrodes TE or sense the touch on the basis of the mutual-capacitance between touch electrodes TE.

When a touch sensing function based on mutual capacitance is provided, the plurality of touch electrodes TE is divided into driving electrodes (transmitting electrodes) and sensing electrodes (receiving electrodes), a touch driving signal is applied to the touch electrodes TE corresponding to the driving electrodes, and touch sensing signals are detected from the touch electrodes TE corresponding to the sensing electrodes.

In the case of touch sensing based on self-capacitance, each touch electrode TE functions as both a touch driving electrode and a touch sensing electrode. For example, a touch driving signal is applied to a touch electrode TE through one touch line, and a touch sensing signal transmitted from the touch electrode TE to which the touch driving signal is applied is received through the same signal line. In this case, the touch driving circuit TDC can supply a driving signal to the touch driving lines and sense the touch sensing lines to calculate presence or absence of a touch, touch coordinates, and the like.

Hereinafter, for convenience of description, a case in which the touch panel TSP is configured on the assumption that a touch is sensed using a self-capacitance method in which one touch electrode TE executes the functions of a driving electrode and a sensing electrode will be described.

FIG. 2 is a diagram for describing a configuration of a touch sensing part according to a comparative example.

Referring to FIG. 2, the touch sensing part according to the comparative example can include a touch panel TSP in which a plurality of touch electrodes TE is disposed and a touch sensing circuit TSC for driving the touch panel TSP.

The touch panel TSP includes a plurality of touch electrodes TE arranged in row and column directions, and a plurality of signal lines SL for electrically connecting the plurality of touch electrodes TE to the touch sensing circuit TSC.

The touch electrodes TE can be electrically connected to the signal lines SL through contact holes. Here, the number of signal lines SL can correspond to the number of channels for signal input and output of the touch sensing circuit TSC. In the touch panel TSP according to the comparative example, one touch electrode TE is connected to one signal line SL, and thus signal lines SL and channels of the touch sensing circuit TSC are equal in number to the touch electrodes TE. According to the example shown in FIG. 2, 40 touch electrodes TE are arranged in 8 rows and 5 columns in the touch panel TSP. In this case, there can be 40 signal lines SL and 40 touch channels.

The touch sensing circuit TSC can process a touch input by supplying a touch driving signals to the plurality of touch electrodes TE, receiving touch sensing signals from the touch electrodes TE to which the touch driving signal is applied, and determining the touch position.

According to the comparative example shown in FIG. 2, since signals from the respective touch electrodes TE are received, the number of touch channels and the number of signal lines SL are the same as the number of touch electrodes TE. Therefore, if the size of the touch panel TSP increases or the number of touch electrodes TE increases to improve the accuracy of touch sensing, the number of signal lines SL can excessively increase, resulting in an increased circuit area and complexity. Additionally, as the number of channels of the touch sensing circuit TSC increases, the price of the touch sensing circuit TSC can increase.

Figure 3:
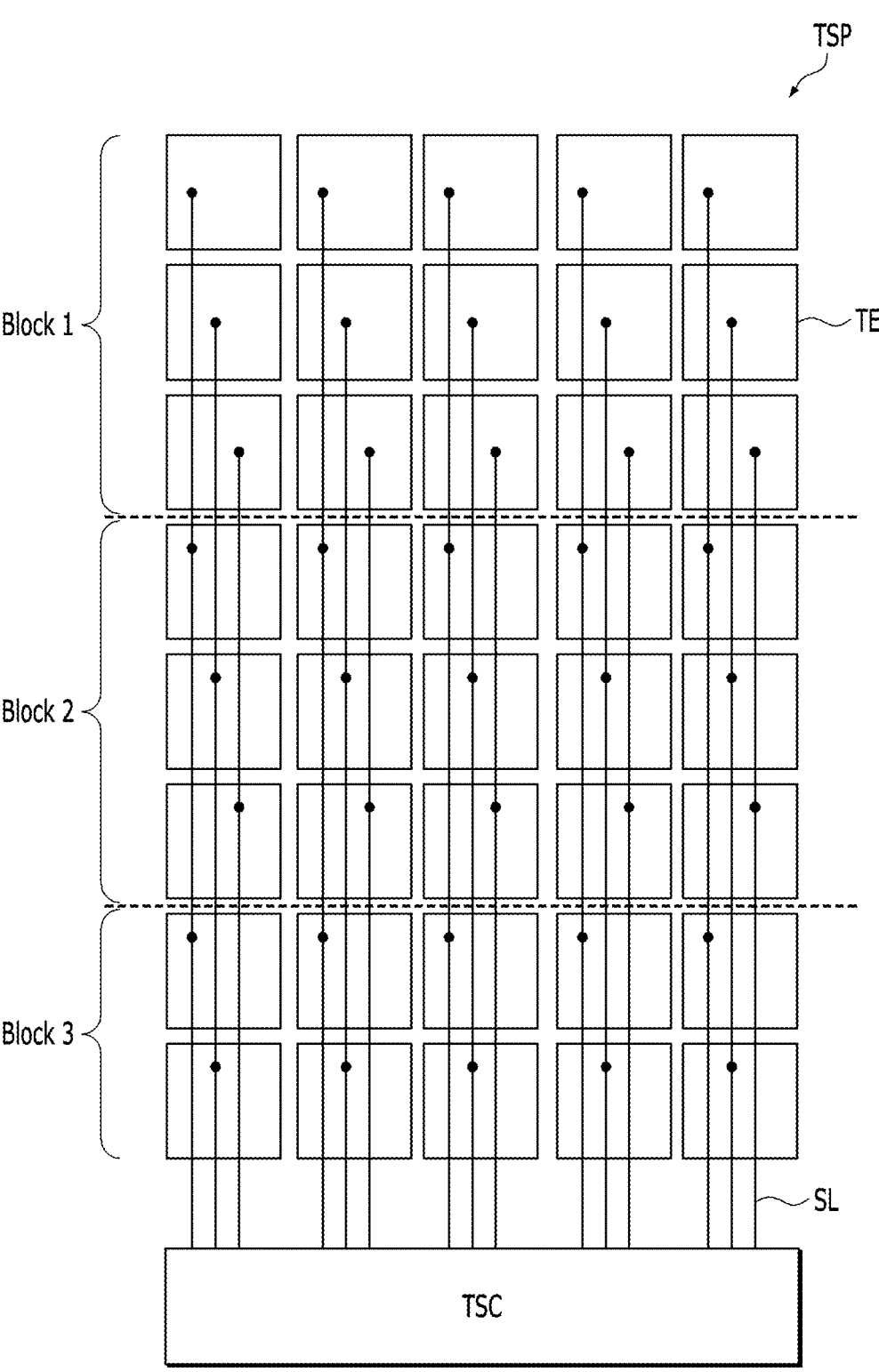
FIG. 3 is a diagram for describing a configuration of a touch sensing part according to an aspect of the present disclosure.

FIG. 3 is a diagram for describing a configuration of a touch sensing part according to an aspect of the present disclosure. The configuration shown in FIG. 3 differs from the configuration shown in FIG. 2 in that the touch panel TSP is configured using a multi-node scheme in which a plurality of touch electrodes TE is connected to one signal line SL. According to the aspect of the present disclosure, the touch electrodes TE arranged in the touch panel TSP can be divided into a plurality of blocks Block1, Block2, and Block3, and a plurality of touch electrodes belonging to different blocks Block1, Block2, and Block3 can be connected to one signal line SL.

Referring to FIG. 3, the touch panel TSP according to the aspect of the present disclosure can include a plurality of touch electrodes TE arranged in row and column directions, and a plurality of signal lines SL for electrically connecting the plurality of touch electrodes TE to the touch sensing circuit TSC.

The plurality of touch electrodes TE arranged in the touch panel TSP can be grouped into a plurality of blocks depending on distances from the touch driving circuit TDC. For example, as shown in FIG. 3, when the touch sensing circuit TSC is arranged at the bottom of the touch panel TSP, touch electrodes belonging to a plurality of rows can be set as one block and grouped into a plurality of blocks. If the touch electrodes TE are arranged in 8 rows, the touch electrodes TE arranged in the first to third rows can be grouped into a first block Block1, the touch electrodes TE arranged in the fourth to sixth rows can be grouped into a second block Block2, and the touch electrodes TE arranged in the seventh and eighth rows can be grouped into a third block Block3.

The touch electrodes TE can be electrically connected to the signal lines SL through contact holes. According to the aspect of the present disclosure, a plurality of touch electrodes TE belonging to different blocks can be connected to one signal line SL. For example, referring to FIG. 3, a touch electrode arranged in the first row of the first block Block1, a touch electrode arranged in the first row of the second block Block2, and a touch electrode arranged in the first row of the third block Block3 can be connected to the first signal line SL disposed in one touch electrode column. A touch electrode arranged in the second row of the first block Block1, a touch electrode arranged in the second row of the second block Block2, and a touch electrode arranged in the second row of the third block Block3 can be connected to the second signal line SL. A touch electrode arranged in the third row of the first block Block1, a touch electrode arranged in the third row of the second block Block2, and a touch electrodes arranged in the third row of the third block Block3 can be connected to the third signal line SL. Therefore, touch sensing signals from eight touch electrodes arranged in one row can be received using three signal lines SL.

As described above, according to the configuration of the touch sensing part according to the aspect of the present disclosure, the touch electrodes TE can be divided into a plurality of blocks in units of rows, and a plurality of touch electrodes TE belonging to different blocks can be connected to one signal line SL. Since one signal line SL is connected to N touch electrodes included in N blocks, the total number of signal lines SL can be reduced to M/N if the total number of touch electrodes is M, and the number of channels of the touch driving circuit TDC can also be reduced to M/N.

Figure 4:
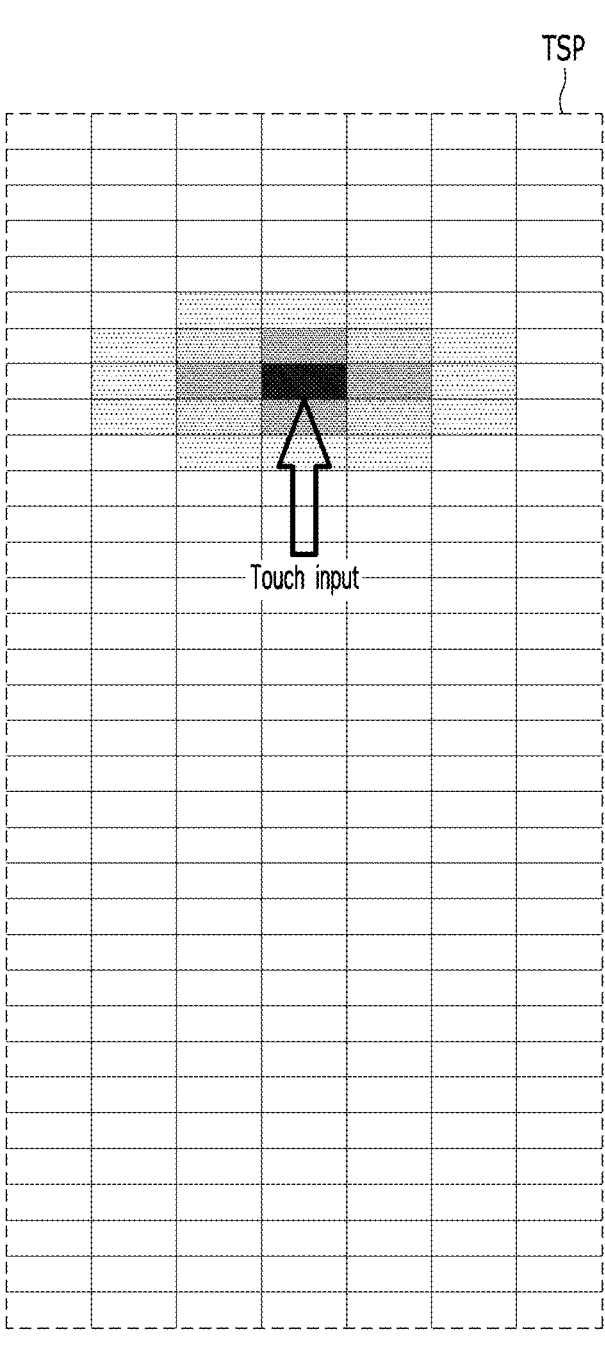
FIG. 4 is a diagram for describing touch data generated from the touch sensing part according to the comparative example.
Figure 5:
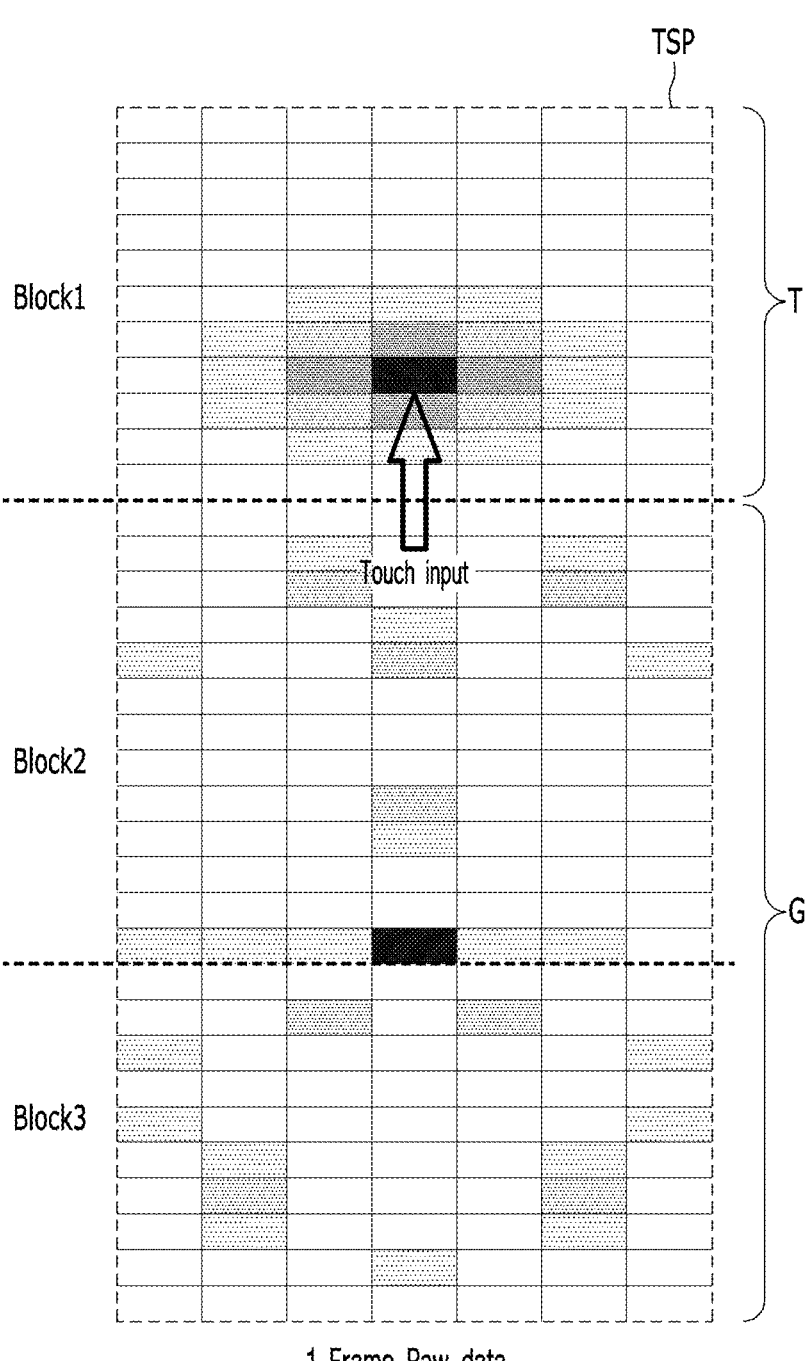
FIG. 5 is a diagram for describing touch data generated from the touch sensing part according to the aspect of the present disclosure.

FIGS. 4 and 5 are diagrams for describing raw data of one frame generated in the touch sensing parts according to the comparative example and the aspect.

The touch sensing circuit TSC can detect the position of a touch input applied to the touch panel TSP by calculating raw data representing a voltage change in a touch electrode TE according to the touch input. The raw data can be a value output as digital data representing a voltage change in the touch electrode TE.

FIG. 4 is a diagram for describing raw data of one frame according to the comparative example, in which touch electrodes are shown darker as the size of the raw data increases.

Referring to FIG. 4, in the touch sensing part according to the comparative example, one signal line SL is connected to one touch electrode TE, and thus raw data can be detected from each touch electrode whose voltage has changed.

When a touch input is applied to the touch panel TSP, the voltage of the touched electrode changes due to a change in the capacitance of the touched electrode, and voltages of adjacent touch electrodes can also change due to the influence of the touch electrode to which the touch input is applied. Accordingly, raw data having the largest value can be detected from the touch electrode TE to which the touch input is applied, and raw data having relatively small values can be detected from adjacent touch electrodes TE. In addition, raw data can be detected as 0 from touch electrodes whose voltages do not change.

FIG. 5 is a diagram for describing touch data generated from the touch sensing part according to the aspect of the present disclosure.

The touch panel TSP according to the aspect of the present disclosure is configured using a multi-node scheme in which a plurality of touch electrodes TE belonging to different blocks is connected to one signal line SL. Therefore, when a touch input is applied to a certain touch electrode TE, touch data is also generated in other touch electrodes TE connected to the same signal line SL. For example, when a touch input is applied to a touch electrode TE of the first block Block1, touch data is also generated in the touch electrodes of the second block Block2 and the third block Block3 connected to the same signal line SL.

Referring to FIG. 5, when a real touch input is applied to the first block Block1, raw data having the largest value is detected from the touch electrode TE to which the touch input is applied, and raw data having relatively small values can be detected from adjacent touch electrodes TE. For example, the area to which the real touch input is applied can be an area where raw data is equal to or greater than a reference value. An area in which raw data within a specific area is equal to or greater than the reference value is referred to as a touch generation area T.

Meanwhile, raw data due to touch is also generated in touch electrodes of the second block Block2 and the third block Block3 connected to the same signal line SL to which the touch electrode TE of the first block Block1 to which the touch input is applied is connected. Raw data obtained from the second block Block2 and the third block Block3 to which the real touch input is not applied can be referred to as ghost data G.

In the touch sensing part according to the aspect of the present disclosure, real touch data T can be generated in a block to which the real touch input is applied, and ghost data G can be generated in the remaining blocks. Accordingly, the aspect of the present disclosure proposes a method in which the touch sensing circuit TSC restores real touch data T by removing ghost data G from raw data. According to the aspect of the present disclosure, it is possible to improve accuracy of determination of real touch data by predicting an area where the real touch data can be generated and reflecting the value of ghost data in estimated touch data included in the area where the real touch data can be generated.

Hereinafter, a touch driving method for determining the position of a real touch input according to an aspect of the present disclosure will be described in detail with reference to the drawings.

Figure 6:
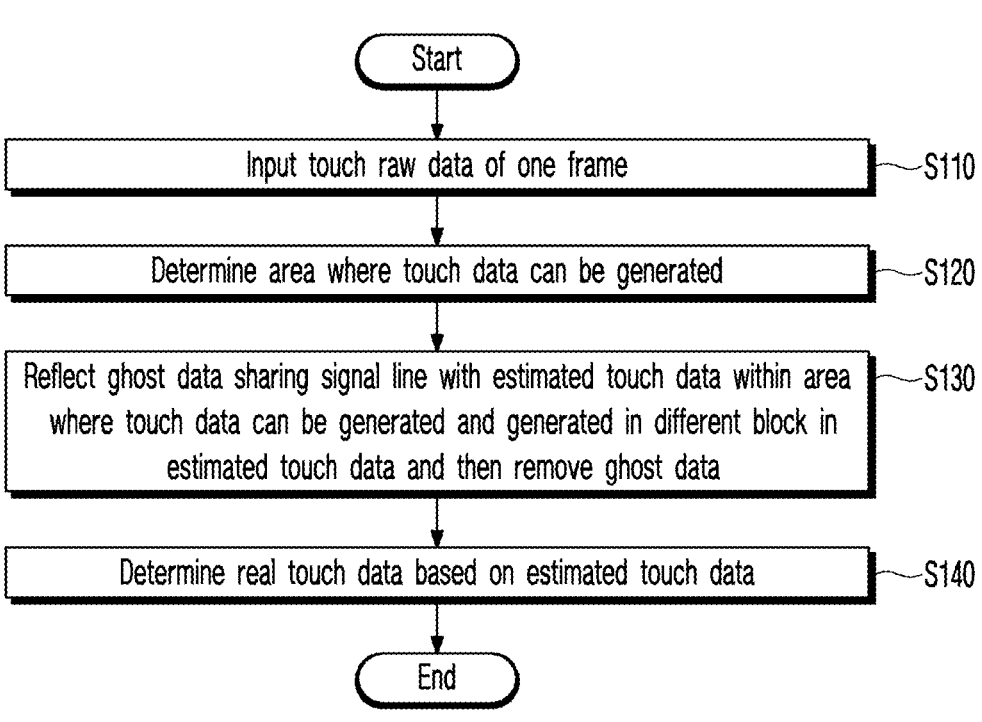
FIG. 6 is a flowchart of a method of driving a touch sensing circuit according to an aspect of the present disclosure.

FIG. 6 is a flowchart of a method of driving the touch sensing circuit according to an aspect of the present disclosure.

Referring to FIG. 6, to sense a touch position, the touch sensing circuit TSC acquires raw data in units of one frame (S110). Raw data of one frame can include voltage information of all touch electrodes included in the touch panel TSP.

The touch sensing circuit TSC can predict an area where real touch data can be generated by analyzing the acquired raw data (S120). The method of predicting an area where real touch data can be generated will be described in detail later with reference to the drawings.

Raw data generated in blocks different from the block related to estimated touch data included in the area where the real touch data can be generated is determined to be ghost data, the ghost data is reflected in the estimated touch data, and then the ghost data is removed (S130). The method of reflecting the ghost data will be described in detail later with reference to the drawings.

The real touch data can be determined on the basis of the finally acquired estimated touch data (S140).

Figure 7:
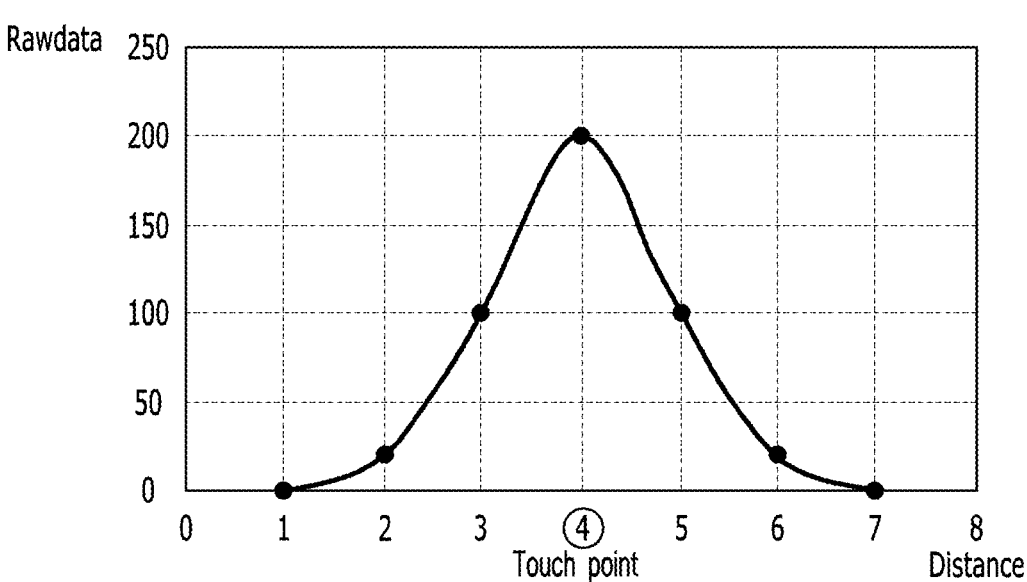
FIG. 7 is a graph showing an example of a distribution of raw data of real touch input.

A method of predicting an area where touch data can be generated in step S120 of FIG. 6 will be described in detail with reference to FIG. 7. FIG. 7 is a graph showing a distribution of raw data obtained during real touch input.

Referring to FIG. 7, when a real touch input is applied, raw data at the touch point has the largest value, and the raw data value decreases with increasing distance from the touch point in up, down, left, and right directions. For example, raw data clustering near the peak point in a Gaussian distribution based on the central peak value can be obtained.

In this manner, the area where touch data can be generated can be predicted using the characteristic that raw data clusters at a point to which a real touch input is applied.

For example, if all raw data present in a 3×3 box area is equal to or greater than the reference value in row data of one frame, the corresponding area can be predicted as an area where touch data can be generated.

The method of reflecting ghost data in the estimated touch data in step S130 of FIG. 6 will be described in detail with reference to FIGS. 8 to 11.

Figure 8:
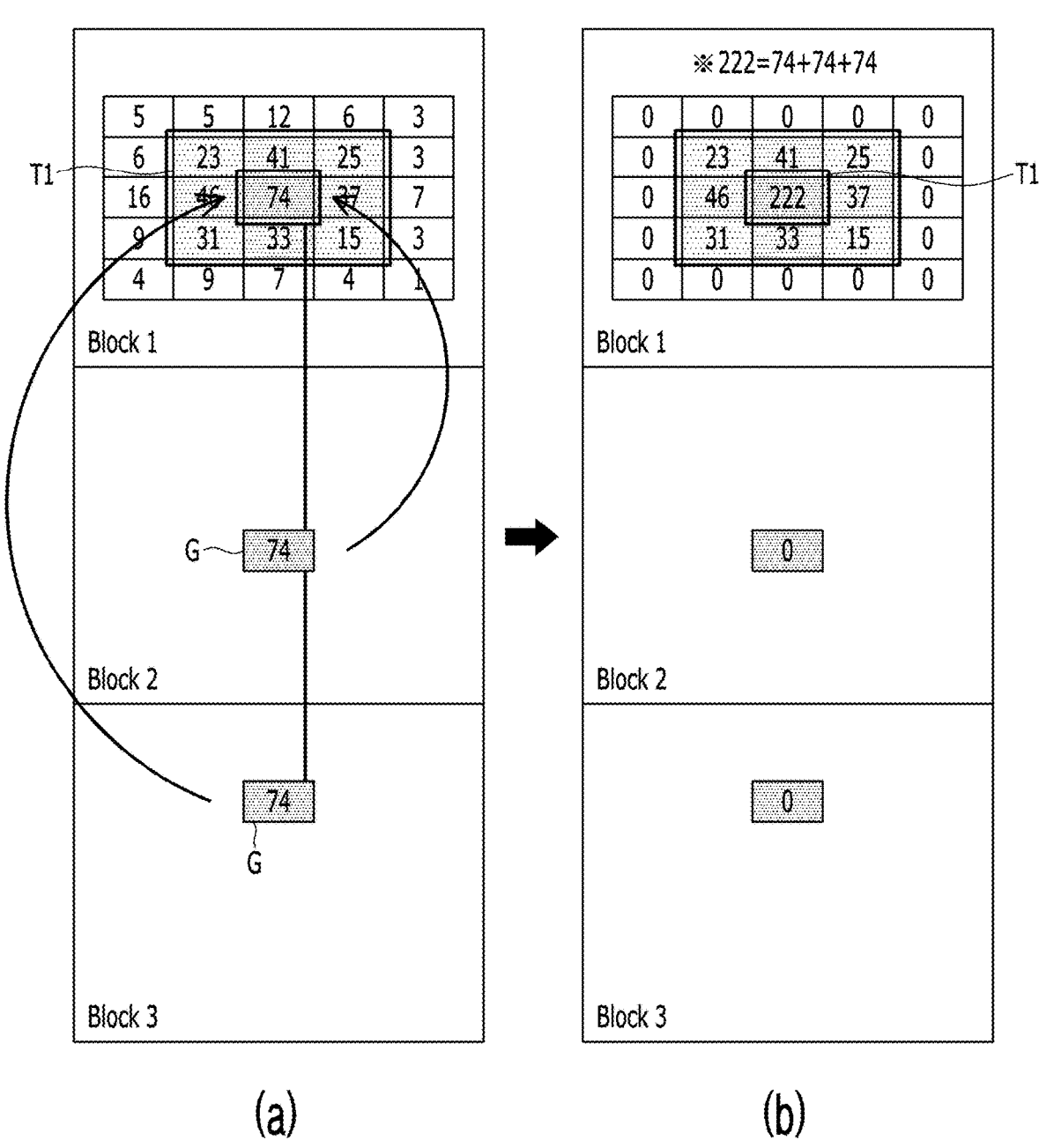
FIGS. 8 to 11 are example diagrams for describing a method of processing ghost data according to an aspect of the present disclosure.

FIG. 8 is a diagram for describing a method of processing ghost data when there is only one piece of estimated touch data according to a first aspect. According to the first aspect, when there is one area where touch data can be generated, ghost data can be added to one piece of estimated touch data.

Referring to FIG. 8, in raw data of one frame, for example, an area in which all raw data present in a 3×3 box area is equal to or greater than the reference value can be determined as an area T1 where touch data can be generated (hereinafter referred to as a touch data generation area). Accordingly, raw data is detected as "74", which is the largest value, and an area in which raw data of adjacent touch electrodes gradually decreases can be predicted as the touch data generation area T1.

Referring to (a) of FIG. 8, when estimated touch data with raw data of "74" is generated in the touch data generation area T1 of the first block Block1, ghost data G with raw data of "74" can be generated in the second block Block2 and the third block Block3 connected to the same signal line SL to which the corresponding touch electrode TE is connected. Accordingly, the ghost data G generated in the second block Block2 and the third block Block3 can be added to the estimated touch data of the first block Block1, and then the ghost data G can be removed.

Referring to (b) of FIG. 8, the value "74" of the ghost data G generated in the second block Block2 and the value "74" of the ghost data G generated in the third block Block3 can be added to the real touch data of the first block Block1, and then the ghost data G can be deleted. Accordingly, the estimated touch data finally obtained can be corrected such that it has a value of "222" in the first block Block1, and no touch data is generated in the second block Block2 and the third block Block3.

Figure 9:
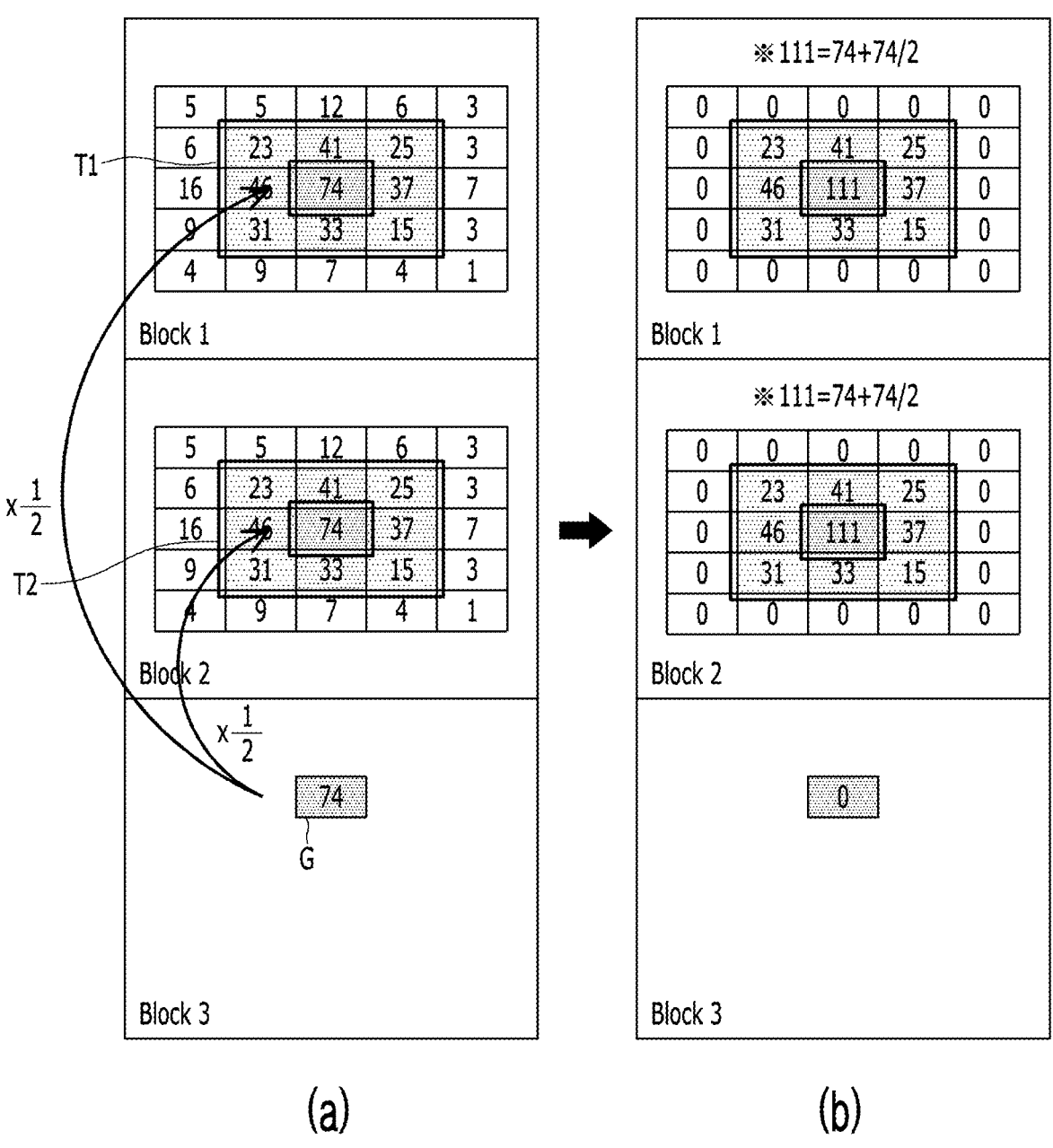

FIG. 9 is a diagram for describing a method of processing ghost data when there are two pieces of estimated touch data sharing a signal line according to a second aspect. According to the second aspect, when there are two pieces of estimated touch data sharing a signal line, the value of ghost data can be divided by 2 and added to the respective pieces of estimated touch data.

Referring to (a) of FIG. 9, a first touch data generation area T1 and a second touch data generation area T2 can be detected in the first block Block1 and the second block Block2, respectively. Ghost data G can be generated in the third block Block3 where no touch occurs.

When a plurality of pieces of estimated touch data sharing a signal line is detected, the value of ghost data G can be divided by the number of pieces of estimated touch data and added to the respective pieces of estimated touch data. In FIG. 9(a), since two pieces of estimated touch data sharing a signal line are detected in the first block Block1 and the second block Block2, the value of the ghost data G of the third block Block3 can be divided by 2 and added to the respective pieces of estimated touch data, and then the ghost data G can be deleted.

Accordingly, as shown in (b) of FIG. 9, the estimated touch data finally obtained can be corrected such that it has a value of "111 (74+74/2=111)" in the first block Block1 and a value of "111 (74+74/2=111)" in the second block Block2, and no touch data is generated in the third block Block3.

Figure 10:
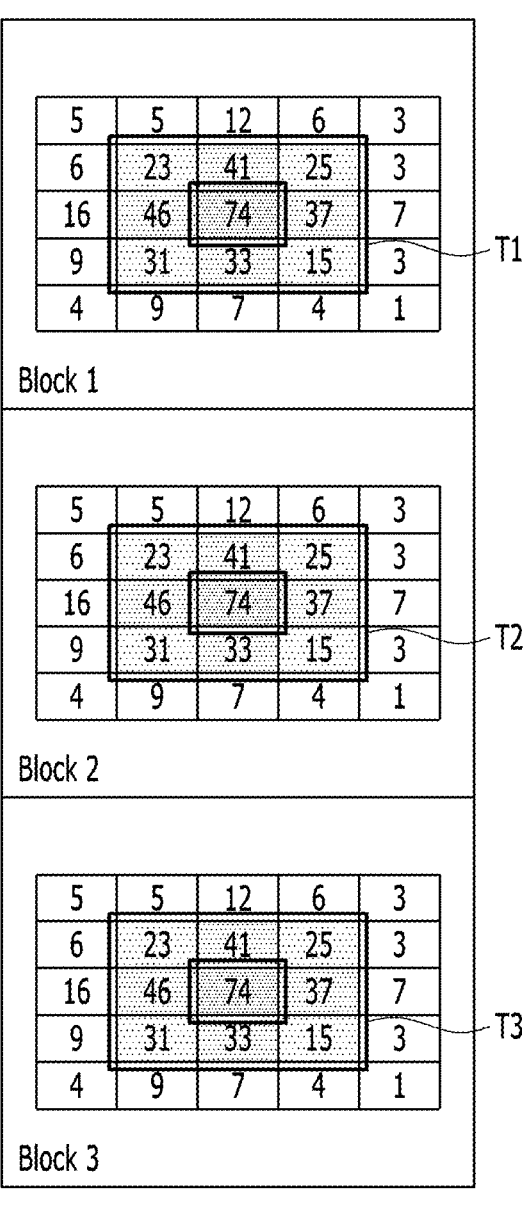

FIG. 10 is a diagram for describing a method of processing ghost data when estimated touch data sharing a signal line is generated in all blocks according to a third aspect. According to the third aspect, when there are three pieces of estimated touch data sharing a signal line in a touch panel having three blocks, it is determined that there is no ghost data, and estimated touch data of each block can be maintained.

Referring to FIG. 10, touch data generation areas T1, T2, and T3 are present in all of the first block Block1, the second block Block2, and the third block Block3, and if estimated touch data sharing a signal line is detected, the estimated touch data can be maintained.

As described above, according to the aspects of the present disclosure, if all raw data present in a reference area is equal to or greater than a reference value, the area can be predicted as a touch data generation area T, and touch data generated in a block sharing the same signal line related to the estimated touch data of the touch data generation area T can be determined as ghost data G. The ghost data G can be removed after being added to the estimated touch data. If there is a plurality of pieces of estimated touch data, the value of ghost data G can be divided and added to the respective pieces of estimated touch data. In the aspects illustrated in FIGS. 8 and 9, the value of the ghost data G is divided equally and added to the estimated touch data, but the present disclosure is not limited to this.

Figure 11:
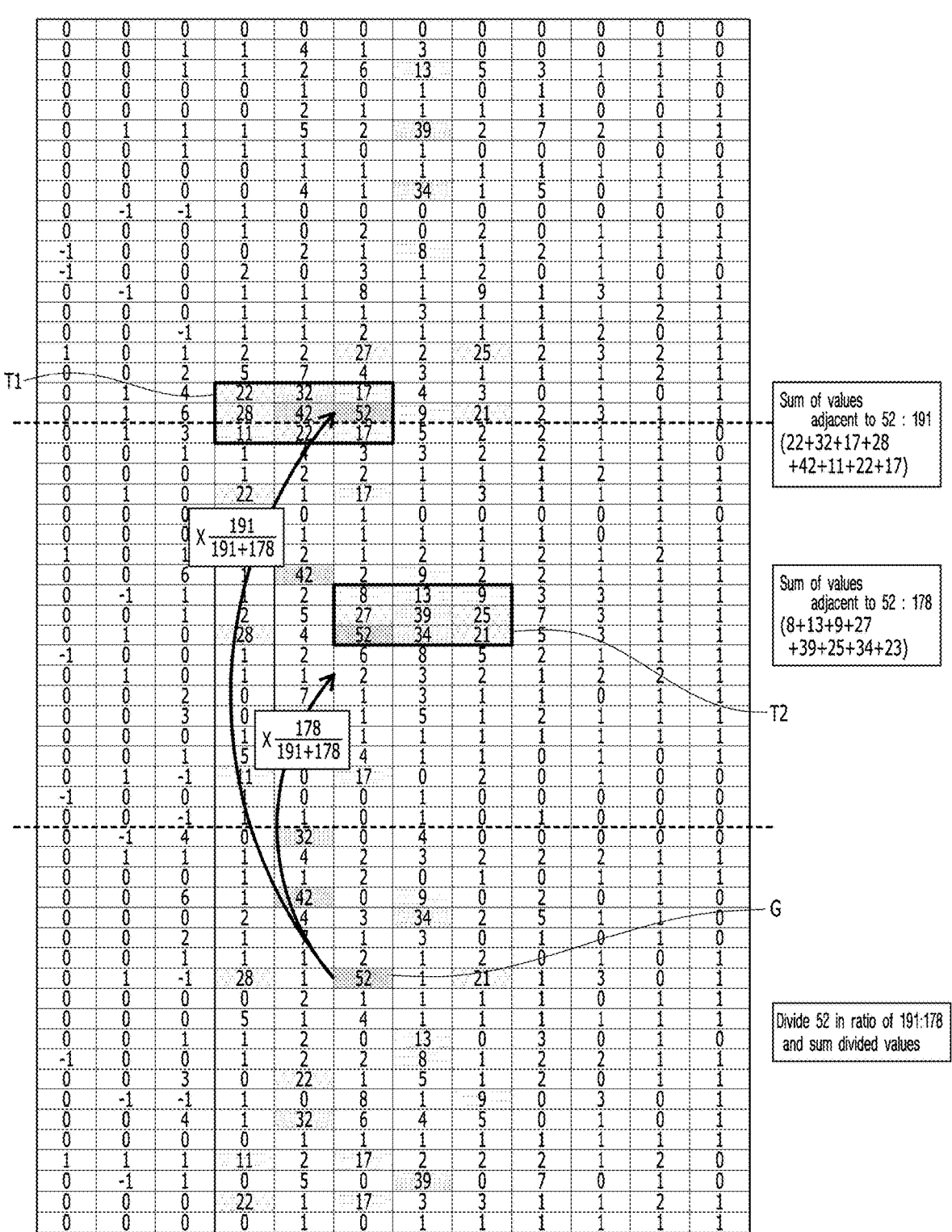

FIG. 11 is a diagram for describing a method of processing ghost data according to a fourth aspect and illustrates a method of correcting a ghost data value to be added according to a weight and then adding the same to the estimated touch data when there is a plurality of pieces of estimated touch data.

Referring to FIG. 11, touch data generation areas T1 and T2 can be identified in the first block Block1 and the second block Block2, and estimated touch data sharing a signal line can be detected from the first touch data generation area T1 and the second touch data generation area T2. Ghost data G can be generated in the third block Block3, which shares the signal line with the estimated touch data and in which no touch data generation area is identified.

The weight for adding the ghost data G can be set depending on the ratio of the sums of the estimated touch data within the touch data generation areas T1 and T2 and raw data values of adjacent areas.

The sum of the estimated touch data "52" of the first touch data generation area T1 and raw data values of adjacent areas can be calculated as "22+32+17+28+42+11+22+17=191", which is the sum of the remaining raw data values excluding "52" in the first touch data generation area T1.

The sum of the estimated touch data "52" of the second touch data generation area T1 and raw data values of adjacent areas can be calculated as "8+13+9+27+39+25+34+23=178", which is the sum of the remaining raw data values excluding "52" in the second touch data generation area T2.

Accordingly, the ghost data values to be added to the estimated touch data of the first touch data generation area T1 and the estimated touch data of the second touch data generation area T2 can be calculated as values obtained by dividing "52" in a ratio of 191:178. As a result, "52×(191/(179+178))" can be added to the estimated touch data of the first touch data generation area T1, and "52×(178/(179+178))" can be added to the estimated touch data of the second touch data generation area T2.

FIGS. 12 to 15 are diagrams for describing a method of processing touch data according to an aspect of the present disclosure.

Particularly, FIG. 12 is a diagram illustrating raw data of one frame obtained to sense a touch position. Referring to FIG. 12, since the touch sensing circuit according to the aspect of the present disclosure acquires raw data from the touch panel configured using the multi-node scheme, real touch data generated from a real touch input, ghost data generated due to sharing a signal line with the real touch data, and ghost data caused by noise generated due to generation of the ghost data and the real touch data can be mixed in raw data of one frame.

Figure 13:
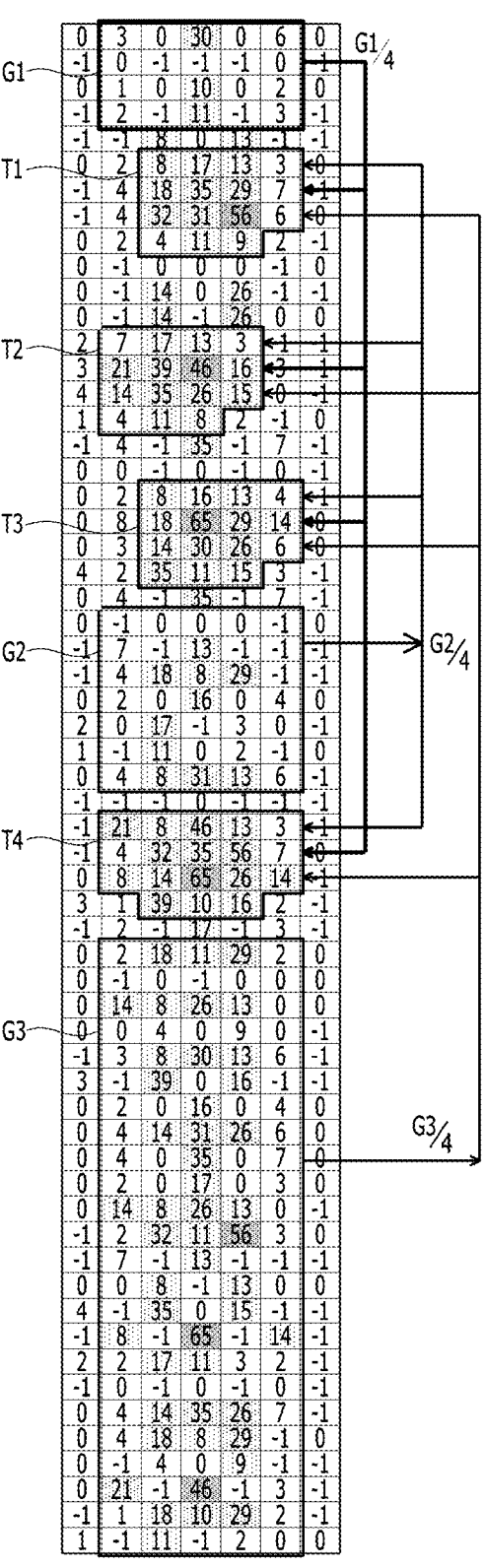

FIG. 13 is a diagram illustrating a method of processing ghost data generated due to sharing a signal line with real touch data.

Referring to FIG. 13, touch data generation areas T1, T2, T3, and T4 can be determined depending on whether all data in a preset area is equal to or greater than a reference value. For example, an area in which all raw data within a 3×3 box area is equal to or greater than a reference value can be determined to be a touch data generation area.

Data generated in areas other than the touch generation area T1, T2, T3, and T4 can be determined as ghost data G1, G2, G3, and G4, and the ghost data can include ghost data sharing a signal line with the real touch data.

According to an aspect of the present disclosure, ghost data that shares a signal line with estimated touch data predicted in the touch data generation areas T1, T2, T3, and T4 can be removed after being reflected in the real touch data. Here, pieces of ghost data that share a signal line with a plurality of pieces of estimated touch data can be divided and added to the respective pieces of estimated touch data.

For example, if four pieces of estimated touch data and one piece of ghost data share a node, the ghost data can be divided into four values and respectively added to the four pieces of estimated touch data.

Here, the ghost data can be equally divided by 4 or weights can be assigned to the ghost data depending on adjacent values of the estimated touch data, and then the ghost data can be added to the estimated touch data. For example, a division ratio of the ghost data can be corrected and then the ghost data can be added such that a larger ratio of raw data is added as raw data adjacent to the estimated touch data has larger values.

Figure 14:
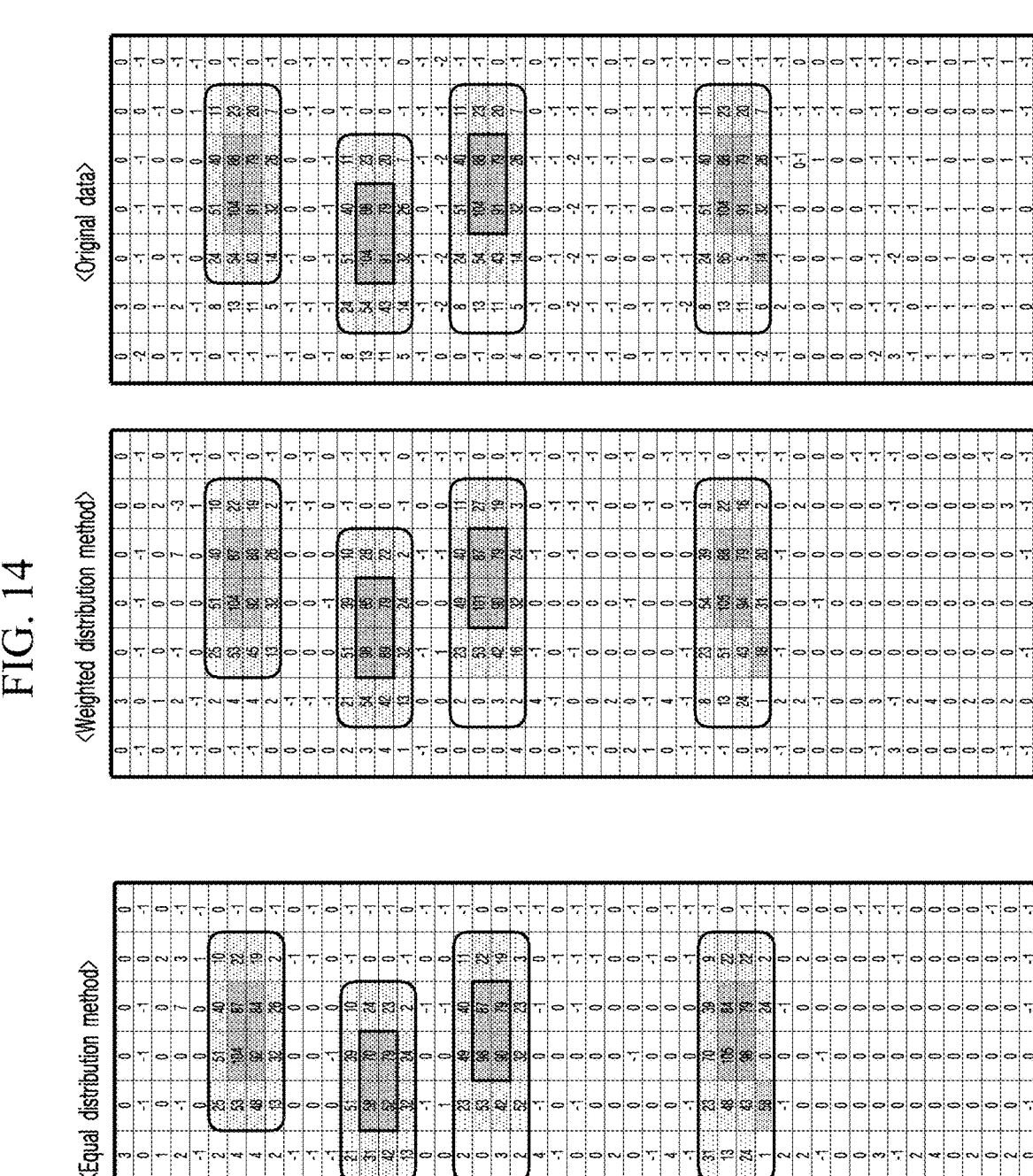

FIG. 14 is a diagram illustrating raw data of one frame obtained after removal of ghost data, and shows a result of restoring data by equally dividing ghost data by 4 and adding the same to estimated touch data, and a result of restoring data by assigning weights to the ghost data depending on values adjacent to the estimated touch data and adding the ghost data to the estimated touch data.

Referring to FIG. 14, comparing the main parts, it is ascertained that, if the part corresponding to raw data "104, 88, 91, 79" in the area T2 of original data is processed using a weighted distribution method, the raw data is restored to "98, 85, 89, 79" in the area T2-1, and if the part is processed in an equal distribution method, the raw data is restored to "58, 70, 52, 79" in the area T2-2. For example, it can be ascertained that raw data, which is "104" in the original data, is restored to "98" when restored using the weighted distribution method, and is restored to "58" when restored using the equal distribution method. Therefore, it can be ascertained that the similarity to the original data increases when ghost data is processed using the weighted distribution method rather than the equal distribution method.

It can be ascertained that raw data of "104, 88, 91, 79" in the area T3 of the original data is restored to "101, 87, 90, 79" when restored using the weighted distribution method and restored to "98, 87, 90, 79" when restored using the equal distribution method.

As a result of calculating the similarity between the original data and restored data, the similarity is 96.8% when the ghost data is processed using the equal distribution method and 99.5% when the ghost data is processed using the weighted distribution method. For example, it can be ascertained that the similarity to the original data increases when the ghost data is processed using the weighted distribution method.

Figure 15:
FIGS. 15 and 16 are example diagrams showing touch data processing results according to the comparative example and the aspect.
Figure 16:
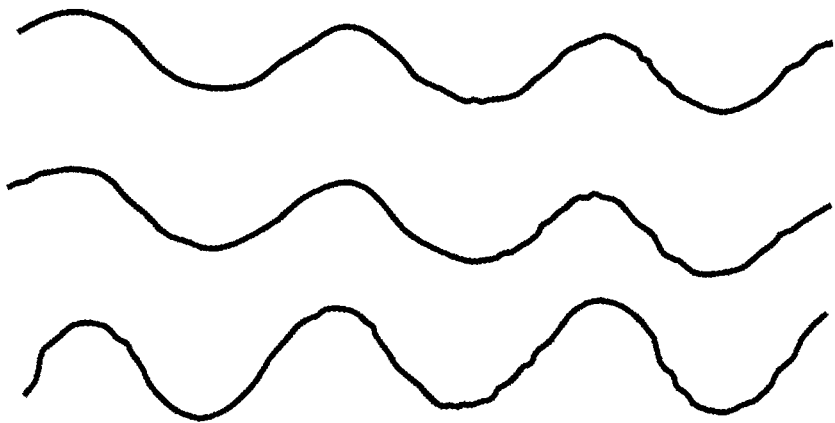

FIGS. 15 and 16 are diagrams showing touch data processing results according to the comparative example and the aspect.

Particularly, FIG. 15 is a diagram showing results of touch data processing according to the comparative example, which is the result of determining a touch input after removing ghost data using a conventional Gaussian filter.

The method of using a Gaussian filter is a method of determining ghost data by comparing the values of raw data present above, below, left, and right of the point where raw data has a peak value equal to or greater than the reference value with other reference values. When ghost data is removed using a Gaussian filter, if the peak value within a reference area, for example, a 3×3 reference area, is less than the reference value, the data is determined to be ghost data and is removed. In addition, if the peak value is equal to or greater than the reference value but the values of the upper, lower, left, and right raw data are less than another reference value, the data is determined to be ghost data and is removed.

In this manner, ghost data is determined and deleted on the basis of the values and distribution of data in a specific area, and thus there is a high probability of errors occurring in which real touch data is deleted or ghost data is processed as real data, as shown in FIG. 15.

FIG. 16 is a diagram showing results of touch data processing according to the aspect, which is the result of determining a touch input after removing ghost data according to the aspect of the present disclosure.

According to the aspect of the present disclosure, if all raw data in a reference area, for example, a 3×3 reference area, is equal to or greater than a reference value, the area can be set to a touch data generation area, and touch data which shares the same signal line with estimated touch data within the touch data generation area and is generated in a different block can be determined as ghost data.

Ghost data that shares the same signal line with the estimated touch data can be added to the estimated touch data and then removed. If there is a plurality of estimated touch data, the value of ghost data can be divided and added to the estimated touch data.

In this manner, by reflecting ghost data that shares the same signal line with estimated touch data and is generated in a different block in the value of the estimated touch data and then deleting the ghost data, it is possible to reduce the probability of an error occurring in which real touch data is deleted or ghost data is processed as real data, as shown in FIG. 16.

Aspects of the present disclosure have the following effects.

The aspects of the present disclosure can provide a touch display device and a method of controlling the same which can ensure accuracy of touch recognition while reducing the number of signal lines and the number of touch channels.

According to the aspects of the present disclosure, it is possible to reduce the number of signal lines and the number of touch channels by configuring a touch panel using a multi-node scheme in which a touch area is divided into a plurality of blocks and a plurality of touch electrodes belonging to different blocks is connected to one touch channel.

According to the aspects of the present disclosure, it is possible to remove ghost factors and improve accuracy of touch recognition by identifying a touch data generation area according to values of raw data in the touch panel configured using the multi-node scheme, and then adding data generated in areas other than the touch data generation area to data of the touch data generation area.

The effects according to the present disclosure are not limited to the above-described effects, and various other effects are included within the present disclosure.

Although aspects of the present disclosure have been described in more detail with reference to the accompanying drawings, the present disclosure is not necessarily limited to these aspects, and various modifications can be made without departing from the technical spirit of the present disclosure. Accordingly, the aspects disclosed in the present disclosure are not intended to limit the technical idea of the present disclosure, but rather to explain the technical idea, and the scope of the technical idea of the present disclosure is not limited by these aspects. Therefore, the aspects described above should be understood in all respects as illustrative and not restrictive. The scope of the present disclosure should be interpreted in accordance with the claims, and all technical ideas within the equivalent scope should be interpreted as being within the scope of the present disclosure.

What is claimed is:

1. A touch display device comprising:
a touch panel including a plurality of touch electrodes arranged into a plurality of blocks such that each block includes multiple touch electrodes;
a plurality of signal lines, each signal line electrically connected to a respective touch electrode from two or more blocks such that each touch electrode in a block is electrically connected to another touch electrode in another block via a signal line; and
a touch sensing circuit configured to generate raw data based on voltages of the touch electrodes of the plurality of blocks input through the signal lines and determine real touch data from the raw data,
wherein the touch sensing circuit predicts an area where the real touch data is generated from raw data of one frame and determines the real touch data by reflecting ghost data generated in areas other than the area where the real touch data is generated in estimated touch data included in the area where the real touch data is able to be generated.

2. The touch display device of claim 1, wherein the estimated touch data and the ghost data share the signal lines.

3. The touch display device of claim 1, wherein, if all raw data included in a preset area in the raw data of one frame is equal to or greater than a reference value, the touch sensing circuit predicts the preset area as the area where the real touch data is able to be generated.

4. The touch display device of claim 3, wherein the touch sensing circuit determines the real touch data by adding the ghost data to the estimated touch data and then removing the ghost data.

5. The touch display device of claim 3, wherein, when two or more pieces of estimated touch data sharing a signal line are generated in an area where two or more pieces of real touch data are able to be generated, the touch sensing circuit divides the ghost data and adds the divided ghost data to the respective pieces of estimated touch data.

6. The touch display device of claim 5, wherein the touch sensing circuit sets a weight depending on values of raw data adjacent to each piece of estimated touch data, divides the ghost data according to the weight, and adds the ghost data to the estimated touch data.

7. The touch display device of claim 1, wherein, when estimated touch data sharing the signal lines is generated in all blocks, the touch sensing circuit maintains each piece of estimated touch data.

8. The touch display device of claim 1, wherein the touch sensing circuit comprises:

a touch driving circuit configured to convert voltage signals of the touch electrodes input through the signal lines into digital signals to generate raw data for each of the plurality of blocks; and a touch controller configured to determine real touch data from the raw data and determine information on a position where a real touch input has occurred on the touch panel.

9. The touch display device of claim 8, wherein the touch driving circuit generates raw data for each of the touch electrodes connected to one signal line.

10. The touch display device of claim 1, wherein each block of the touch panel includes two or more touch electrode rows, and two or more touch electrodes included in the same touch electrode column are connected to one signal line.

11. A method of controlling a touch display device including a touch panel having a plurality of touch electrodes arranged into a plurality of blocks such that each block includes multiple touch electrodes and a plurality of signal lines with each signal line electrically connected to a respective touch electrode from two or more blocks such that each touch electrode in a block is electrically connected to another touch electrode in another block via a signal line, the method comprising:

generating raw data of one frame based on voltages of the touch electrodes of the plurality of blocks input through the signal lines;

predicting an area in which all raw data included in a preset area in the raw data of one frame is equal to or greater than a reference value as an area where real touch data is able to be generated;

reflecting ghost data sharing a signal line with estimated touch data included in the area where the real touch data is generated, the ghost data being generated in an area other than the area where the real touch data is generated in the estimated touch data, and deleting the ghost data; and determining the real touch data based on the estimated touch data.

12. The method of claim 11, wherein the reflecting the ghost data in the estimated touch data comprises:

when two or more pieces of estimated touch data are generated, dividing the ghost data and adding the divided ghost data to the respective pieces of estimated touch data.

13. The method of claim 12, wherein the dividing and adding the ghost data comprises:

setting a weight depending on values of raw data adjacent to each piece of estimated touch data; and dividing the ghost data according to the weight and adding the divided ghost data.

14. The method of claim 11, further comprising:

when estimated touch data is generated in all blocks, maintaining each piece of estimated touch data.

\* \* \* \* \*